Patented Nov. 4, 1930

1,780,879

UNITED STATES PATENT OFFICE

WINFRID HENTRICH AND MAX HARDTMANN, OF WIESDORF-ON-THE-RHINE, AND RUDOLF KNOCHE, OF LEVERKUSEN-ON-THE-RHINE, GERMANY, ASSIGNORS TO GENERAL ANILINE WORKS, INC., OF NEW YORK, N. Y., A CORPORATION OF DELAWARE

CONDENSATION PRODUCT OF THE BENZODIAZINE SERIES

No Drawing. Application filed March 8, 1928, Serial No. 260,239, and in Germany March 18, 1927.

The present invention concerns new condensation products of the benzodiazine series and the process of producing the same. They most probably have the general formula:

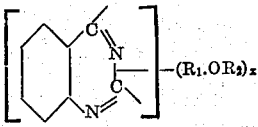

wherein $R_1$ stands for an aromatic residue, which is attached to the diazine nucleus through a carbon atom, $R_2$ stands for hydrogen which may be replaced by alkyl and $x$ stands for one of the numbers one and two.

Our new compounds can be prepared by any of the customary processes for producing a carbon-carbon-linkage, e. g. by heating together benzodiazine which is substituted in the diazine nucleus by halogen with a substituted or not substituted phenolic body in the presence of aluminium chloride, or by heating together a benzodiazine which is substituted in the diazine nucleus by halogen with a halogenated phenolic body in the presence of an alkali metal. Otherwise our new compounds may be prepared by causing suitable aromatic magnesium halogenide compounds, e. g. alkoxy phenyl magnesium bromide in ethereal solution to react upon halogenated benzodiazine containing the halogen in the diazine nucleus.

Our new products are generally high melting or not melting yellowish powders which are insoluble in water, soluble in organic solvents with a yellowish coloration. The products, either as such or after further treatment, are intended to be used for the most varied purposes, for example, as intermediate products in the manufacture of dyestuffs.

The following examples will illustrate our invention, which, of course, is not in any way restricted thereby:

*Example 1.*—145 parts by weight of 1-hydroxynaphthalene are dissolved in 1000 parts of tetrachlorethane, 100 parts by weight of 2.4-dichloroquinazoline are added and gradually 160 parts by weight of powdered anhydrous aluminium chloride. The mixture is heated for an hour to 90–100° C. and worked up as customary. The resulting yellowish powder is the 2.4-di(4'-hydroxynaphthyl)-quinazoline

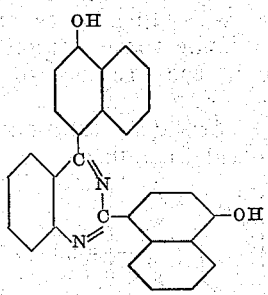

It can be recrystallized from alcohol. It chars at 240–250° C. without melting. It dissolves in concentrated sulfuric acid with an intense violet coloration, from this solution the product is recovered unchanged by pouring the same into ice-water.

*Example 2.*—By replacing in the above example the 2:4-dichloroquinazoline by 164.5 parts by weight of 4-chloroquinazoline and proceeding in an analogous manner the 4-(4'-hydroxy-naphthyl)-quinazoline

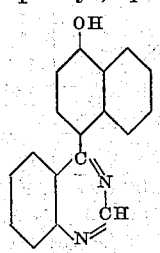

possessing the melting point 230–232° C. is obtained. It dissolves in concentrated sulfuric acid with a violet blue coloration.

*Example 3.*—To 211.5 parts by weight of para-anisol-magnesium-bromide of the formula:

prepared in the customary manner dissolved in benzene are added 164.5 parts by weight of 4-chloroquinazoline and the whole is stirred for two hours at a temperature of 30–40° C. Then the magnesium-chloride-bromide is filtered off. From the concentrated solution 4(4'-methoxy-phenyl)-quinazoline of the probable formula:

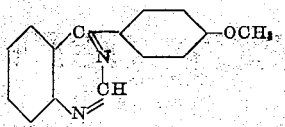

separates in yellowish crystals.

We claim:

1. Process for producing new condensation products of the benzodiazine series, which process comprises causing a halogenated benzodiazine containing at least one halogen atom in the diazine nucleus to react upon an aromatic phenolic compound in the presence of aluminium chloride.

2. Process for producing new condensation products of the benzodiazine series, which process comprises causing 2.4-dichloro-benzodiazine to react upon 1-hydroxy-naphthalene in the presence of aluminium chloride.

3. As new products compounds of the probable general formula:

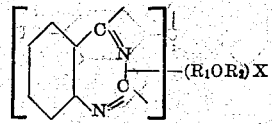

wherein $R_1$ stands for an aromatic residue, which is attached to the diazine nucleus through a carbon atom $R_2$ stands for hydrogen which may be replaced by alkyl and $x$ stands for one of the numbers one and two, being generally high melting or not melting yellowish powders, which are unsoluble in water, soluble in organic solvents with a yellowish coloration.

4. As new products compounds of the probable formula:

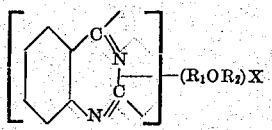

wherein $R_1$ stands for a naphthalene residue, which is attached to the diazine nucleus through a carbon atom, $R_2$ stands for hydrogen which may be replaced by alkyl and $x$ stands for one of the numbers one and two, being generally high melting or not melting yellowish powders, which are insoluble in water, soluble in organic solvents with a yellowish coloration.

5. As a new product 2.4-di-(4'-hydroxy-naphthyl)-quinazoline

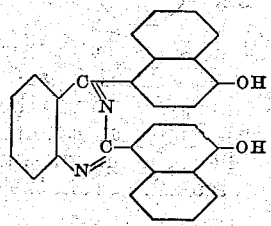

being a yellowish powder, insoluble in water, soluble in alcohol with a yellowish coloration and in concentrated sulfuric acid with an intense violet coloration.

In testimony whereof we have hereunto set our hands.

WINFRID HENTRICH.
MAX HARDTMANN.
RUDOLF KNOCHE.